(12) United States Patent
Ma et al.

(10) Patent No.: US 12,362,501 B2
(45) Date of Patent: Jul. 15, 2025

(54) ANTENNA ARRAY, ARRAY ARRANGEMENT AND METHODS OF FORMING THE SAME

(71) Applicant: Agency for Science, Technology and Research, Singapore (SG)

(72) Inventors: Yugang Ma, Singapore (SG); Yonghong Zeng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 143 days.

(21) Appl. No.: 18/282,710

(22) PCT Filed: Mar. 15, 2022

(86) PCT No.: PCT/SG2022/050132
§ 371 (c)(1),
(2) Date: Sep. 18, 2023

(87) PCT Pub. No.: WO2022/211725
PCT Pub. Date: Oct. 6, 2022

(65) Prior Publication Data
US 2024/0162630 A1    May 16, 2024

(30) Foreign Application Priority Data

Mar. 30, 2021 (SG) .............. 10202103224P

(51) Int. Cl.
*H01Q 21/06* (2006.01)
*H01Q 1/32* (2006.01)
*H01Q 21/08* (2006.01)

(52) U.S. Cl.
CPC ......... *H01Q 21/065* (2013.01); *H01Q 1/3233* (2013.01); *H01Q 21/08* (2013.01)

(58) Field of Classification Search
CPC .... H01Q 21/065; H01Q 1/3233; H01Q 21/08; G01S 13/42
See application file for complete search history.

(56) References Cited

U.S. PATENT DOCUMENTS

| | | | |
|---|---|---|---|
| 2016/0025839 A1* | 1/2016 | Trummer | H01Q 1/3233 342/188 |
| 2020/0103495 A1* | 4/2020 | Iwasa | G01S 7/4026 |
| 2022/0236407 A1* | 7/2022 | Lim | H01Q 1/24 |

FOREIGN PATENT DOCUMENTS

CN    112103666 A    12/2020

OTHER PUBLICATIONS

International Search Report for International Application No. PCT/SG2022/050132 dated Jun. 28, 2022, pp. 1-3.
(Continued)

*Primary Examiner* — David E Lotter
(74) *Attorney, Agent, or Firm* — Shackelford, McKinley & Norton, LLP

(57) ABSTRACT

An antenna array integrated in an integrated circuit package. The antenna array may include a first receiver column. The antenna array may also include a plurality of second receiver columns. The antenna array may also include a first transmitter column and a second transmitter column arranged between the first receiver column and the plurality of second receiver columns. A spacing between the first transmitter column and the second transmitter column may be about half a spacing between neighbouring second receiver columns of the plurality of second receiver columns. A distance between the first receiver column and a second receiver column of the plurality of second receiver columns nearest to the first receiver column may be about N times the spacing between the neighbouring second receiver columns of the plurality of second receiver columns, N being a number of second receiver columns.

20 Claims, 12 Drawing Sheets

(56) References Cited

OTHER PUBLICATIONS

Written Opinion of the International Searching Authority for International Application No. PCT/SG2022/050132 dated Jun. 28, 2022, pp. 1-4.

* cited by examiner

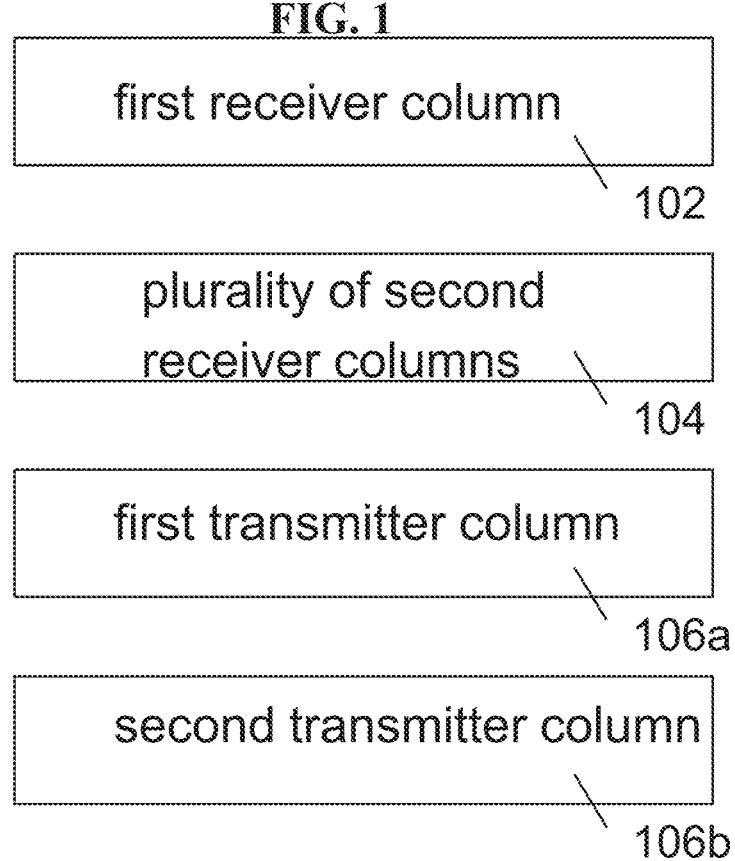

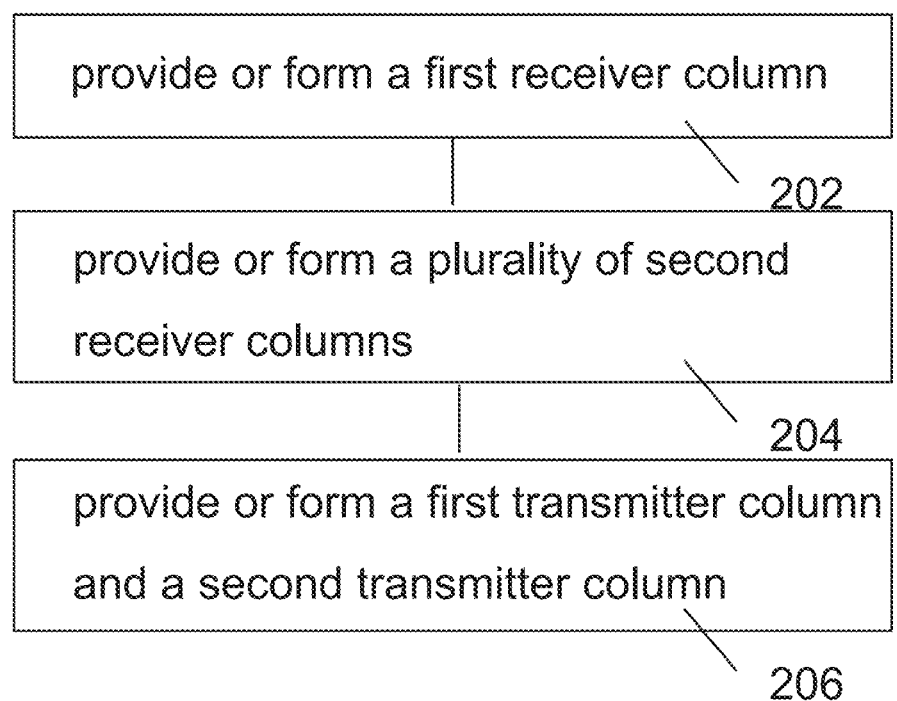

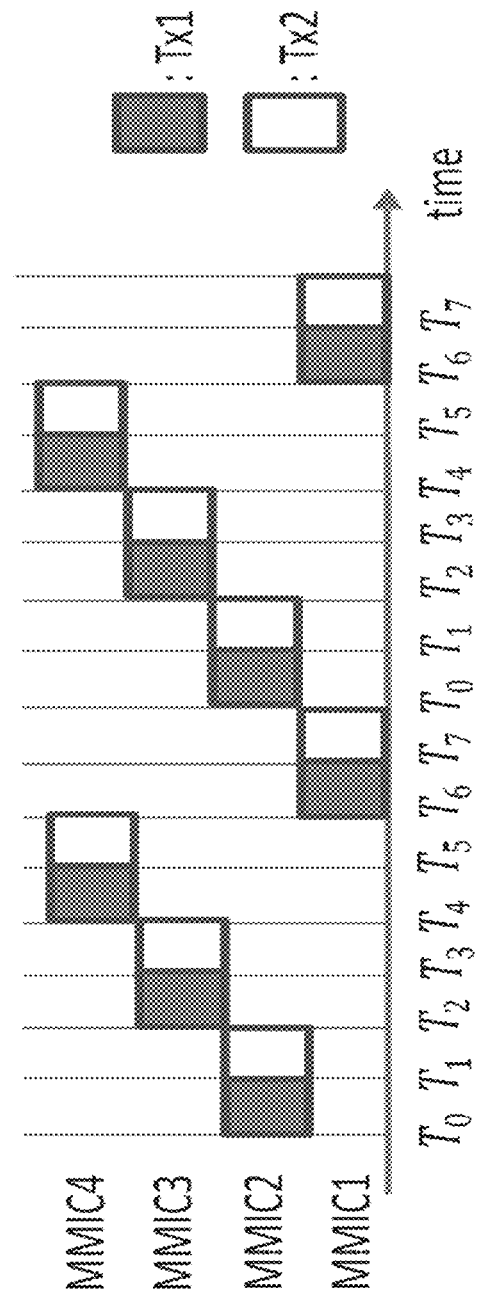

ANTENNA ARRAY, ARRAY ARRANGEMENT AND METHODS OF FORMING THE SAME

CROSS-REFERENCE TO RELATED APPLICATION

This application claims the benefit of priority of Singapore application No. 10202103224P filed Mar. 30, 2021, the contents of it being hereby incorporated by reference in its entirety for all purposes.

TECHNICAL FIELD

Various embodiments of this disclosure may relate to an antenna array. Various embodiments of this disclosure may relate to an array arrangement. Various embodiments of this disclosure may relate to a method of forming an antenna array. Various embodiments of this disclosure may relate to a method of forming an array arrangement.

BACKGROUND

Direction of Arrival (DoA) estimation is crucial for radio detection and ranging (radar) applications. In addition to ranging, the target can be localized. A high detection resolution is a goal of radar. For a given physical size, compared with traditional radar, the multiple-input and multiple-output (MIMO) radar achieves much higher detection resolution and can identify more targets due to the concept of the enlarged virtual aperture formed by the virtual antenna array (VAA) and the independent reflection paths reducing target radar cross section (RCS) scintillation. Thus, MIMO radar has attracted many research interests, especially in applications such as the autonomous vehicles, in which the physical radar size is restricted but high detection resolution is required.

In order to increase reliability and reduce the cost, the idea of integrating the antenna array in integrated circuit (IC) packages has emerged in the past 10 years. This is especially desired for millimetre wave (mmWave) radar systems, where the radio frequency (RF) coupling reliability and transmission loss are very sensitive to dimension errors and the length of the transmission line, because implementing antenna in package (AiP) has much higher dimension accuracy as well as shorter transmission line. However, unlike the antenna array designs for outside the package, which a designer mainly considers how to reduce the number of signal channels so as to save the cost, in AiP design, the limitation of physical size of the package also needs to be considered. This brings an extra challenge as compared to the design of the MIMO antenna array for outside the package.

SUMMARY

Various embodiments may relate to an antenna array. The antenna array may include a first receiver column. The antenna array may also include a plurality of second receiver columns. The antenna array may also include a first transmitter column and a second transmitter column arranged between the first receiver column and the plurality of second receiver columns. A spacing between the first transmitter column and the second transmitter column may be about half a spacing between neighbouring second receiver columns of the plurality of second receiver columns. A distance between the first receiver column and a second receiver column of the plurality of second receiver columns nearest to the first receiver column may be about N times the spacing between the neighbouring second receiver columns of the plurality of second receiver columns, N being a number of second receiver columns.

Various embodiments may relate to an array arrangement. The array arrangement may include two azimuth packages including a first antenna array as described herein, each of the two azimuth packages including a monolithic microwave integrated circuit (MMIC) die. The array arrangement my also include a further azimuth package including a first long range transmitter arrangement and a second long range transmitter arrangement interdigitated with the first long range transmitter arrangement, the further azimuth package including a monolithic microwave integrated circuit (MMIC) die electrically connected to the monolithic microwave integrated circuit (MMIC) dies of the two azimuth packages. The array arrangement may further include two elevation packages including a second antenna array as described herein arranged orthogonal to the first antenna array, each of the two elevation packages including a monolithic microwave integrated circuit (MMIC) die. The array arrangement may also include a further elevation package orthogonal to the further azimuth package, the further elevation package including a further first long range transmitter arrangement and a further second long range transmitter arrangement interdigitated with the further first long range transmitter arrangement, the further elevation package including a monolithic microwave integrated circuit (MMIC) die electrically connected to the monolithic microwave integrated circuit (MMIC) dies of the two elevation packages.

Various other embodiments may relate to another array arrangement. The array arrangement may include two azimuth packages including a first antenna array as described herein, each of the two azimuth packages including a monolithic microwave integrated circuit (MMIC) die. The array arrangement may include a further azimuth package including a first long range transmitter arrangement and a second long range transmitter arrangement interdigitated with the first long range transmitter arrangement, the first long range transmitter arrangement and the second long range transmitter arrangement electrically connected to at least one monolithic microwave integrated circuit (MMIC) die of the monolithic microwave integrated circuit (MMIC) dies included in the two azimuth packages. The array arrangement may also include two elevation packages including a second antenna array as described herein arranged orthogonal to the first antenna array, each of the two elevation packages including a monolithic microwave integrated circuit (MMIC) die electrically connected to the monolithic microwave integrated circuit (MMIC) dies of the two azimuth packages. The array arrangement may include a further elevation package orthogonal to the further azimuth package, the further elevation package including a further first long range transmitter arrangement and a further second long range transmitter arrangement interdigitated with the further first long range transmitter arrangement, the further first long range transmitter arrangement and the further second long range transmitter arrangement electrically connected to at least one monolithic microwave integrated circuit (MMIC) die of the monolithic microwave integrated circuit (MMIC) dies included in the two elevation packages.

Various embodiments may relate to a method of forming an antenna array. The method may include providing or forming a first receiver column. The method may also include providing or forming a plurality of second receiver columns. The method may additionally include providing or forming a first transmitter column and a second transmitter column arranged between the first receiver column and the plurality of second receiver columns. A spacing between the first transmitter column and the second transmitter column may be about half a spacing between neighbouring second receiver columns of the plurality of second receiver columns. A distance between the first receiver column and a second receiver column of the plurality of second receiver columns nearest to the first receiver column may be about N times the spacing between the neighbouring second receiver columns of the plurality of second receiver columns, N being a number of second receiver columns.

Various embodiments may relate to a method of forming an array arrangement. The method may include providing two azimuth packages including a first antenna array as described herein, each of the two azimuth packages including a monolithic microwave integrated circuit (MMIC) die. The method may include providing a further azimuth package including a first long range transmitter arrangement and a second long range transmitter arrangement interdigitated with the first long range transmitter arrangement, the further azimuth package including a monolithic microwave integrated circuit (MMIC) die electrically connected to the monolithic microwave integrated circuit (MMIC) dies of the two azimuth packages. The method may additionally include providing two elevation packages including a second antenna array as described herein, the second antenna array arranged orthogonal to the first antenna array, each of the two elevation packages including a monolithic microwave integrated circuit (MMIC) die. The method may additionally include providing a further elevation package orthogonal to the further azimuth package, the further elevation package including a further first long range transmitter arrangement and a further second long range transmitter arrangement interdigitated with the further first long range transmitter arrangement, the further elevation package including a monolithic microwave integrated circuit (MMIC) die electrically connected to the monolithic microwave integrated circuit (MMIC) dies of the two elevation packages.

Various embodiments may relate to a method of forming an array arrangement. The method may include providing two azimuth packages including a first antenna array as described herein, each of the two azimuth packages including a monolithic microwave integrated circuit (MMIC) die. The method may also include providing a further azimuth package including a first long range transmitter arrangement and a second long range transmitter arrangement interdigitated with the first long range transmitter arrangement, the first long range transmitter arrangement and the second long range transmitter arrangement electrically connected to at least one monolithic microwave integrated circuit (MMIC) die of the monolithic microwave integrated circuit (MMIC) dies included in the two azimuth packages. The method may additionally include providing two elevation packages including a second antenna array as described herein, the second antenna array arranged orthogonal to the first antenna array, each of the two elevation packages including a monolithic microwave integrated circuit (MMIC) die electrically connected to the monolithic microwave integrated circuit (MMIC) dies of the two azimuth packages. The method may further include providing a further elevation package orthogonal to the further azimuth package, the further elevation package including a further first long range transmitter arrangement and a further second long range transmitter arrangement interdigitated with the further first long range transmitter arrangement, the further first long range transmitter arrangement and the further second long range transmitter arrangement electrically connected to at least one monolithic microwave integrated circuit (MMIC) die of the monolithic microwave integrated circuit (MMIC) dies included in the two elevation packages.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

FIG. 1 is a general illustration of an antenna array according to various embodiments.

FIG. 2 is a general illustration of a method of forming an antenna array according to various embodiments.

FIG. 12 is a schematic showing a time division multiplexing method according to various embodiments.

DESCRIPTION

Figure 3A:
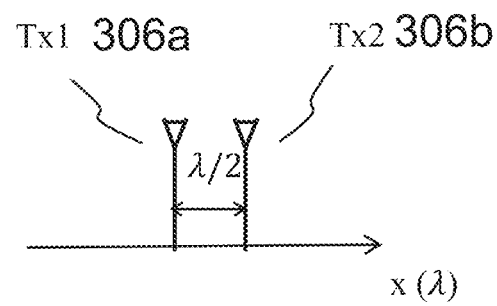
FIG. 3A shows an antenna array layout including two transmitter antennas (Tx1 and Tx2) according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the antenna arrays/array arrangements are analogously valid for the other antenna arrays/array arrangements. Similarly, embodiments described in the context of a method are analogously valid for an antenna array/array arrangement, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may relate to an antenna array layout for implementing antenna in package MIMO radar for high resolution Direction of Arrival (DoA) detection. Various embodiments may be suitable for automotive applications. In principle, DoA estimation performance may be proportional to the size of the antenna array and the degree of freedom (DoF) of the antenna array. However, when one implements the antenna array in an integrated circuit (IC) package, the space and the number of the radio frequency (RF) channels are limited due to reliability and cost reasons. Various embodiments may relate to embedding the transmitter antenna array into the receiver antenna array so as to save the space. The same DoF may be achieved with less than a half the number of RF channels compared with the common MIMO antenna array. Various embodiments may also relate to a corresponding MIMO virtual element recovery algorithm for the proposed antenna array, which has reduced computation complexity compared to the standard Khatri-Rao (KR)-product recovery. Various embodiments may relate to arrangements of arrays for 2-dimensional (2-D) DoA estimation as well as long-range radar (LRR) and short-range radar (SRR). Various embodiments may also relate to detailed antenna designs for the implementation in IC packages with consideration of the package size.

FIG. 1 is a general illustration of an antenna array according to various embodiments. The antenna array may include a first receiver column 102. The antenna array may also include a plurality of second receiver columns 104. The antenna array may also include a first transmitter column 106a and a second transmitter column 106b arranged between the first receiver column 102 and the plurality of second receiver columns 104. A spacing between the first transmitter column 106a and the second transmitter column 106b may be about half a spacing between neighbouring second receiver columns of the plurality of second receiver columns 104. A distance between the first receiver column 102 and a second receiver column of the plurality of second receiver columns 104 nearest to the first receiver column 102 may be about N times the spacing between the neighbouring second receiver columns of the plurality of second receiver columns 104, N being a number of second receiver columns.

In other words, the antenna array may include transmitter columns 106a, 106b arranged between receiver columns 102, 104. More specifically, the transmitter columns 106a, 106b may be arranged between the first receiver column 102 and the plurality of second receiver columns 104.

For instance, if the spacing between neighbouring second receiver columns of the plurality of second receiver columns 104 is $\lambda$, the spacing between the first transmitter column 106a and the second transmitter column 106 may be $0.5\lambda$. The distance between the first receiver column 102 and a second receiver column of the plurality of second receiver columns 104 nearest to the first receiver column 102 may be $N\lambda$, where N corresponds to the number of the second receiver columns 104 included in the antenna array. In the current context, "N" may be any natural number, e.g. 1, 2, 3, 4 and so on. The antenna array may also be referred to as antenna array layout. $\lambda$, i.e. the spacing between neighbouring second receiver columns of the plurality of second receiver columns 104, may correspond to one wavelength of the radio frequency (RF) signal. In various embodiments, the first receiver column 102, the plurality of second receiver columns 104, and the transmitter columns 106a, 106b may have the same polarization direction.

In the current context, a "neighbouring" column may refer to the nearest column. Accordingly, "a spacing between neighbouring second receiver columns" may refer to the distance between a second receiver column, and another second receiver column nearest to the second receiver column. In the situation, in which there are two other nearest second receiver columns of the same distance from a specific second receiver column, the spacing may be taken as the distance between the specific second receiver column and either of the two other nearest second receiver columns.

For avoidance of doubt, FIG. 1 serves to provide a general illustration of various features present in an antenna array according to various embodiments, and is not intended to limit, for instance, the size, shape, arrangement, orientation etc. of the various features.

In various embodiments, a centre line between the first transmitter column 106a and the second transmitter column 106b may be about half the distance between the first receiver column 102 and the second receiver column of the plurality of second receiver columns 104 nearest to the first receiver column. In other words, the centre line of the first transmitter column 106a and the second transmitter column 106b may coincide with a centre line between the first receiver column 102 and the second receiver column of the plurality of second receiver columns 104 nearest to the first receiver column.

In various embodiments, a distance between the centre line and the first transmitter column 106a may be equal to a distance between the centre line and the second transmitter column 106b.

In various embodiments, the first receiver column may include a first plurality of receiver antenna elements (also referred to as a first plurality of receiver antennas). In various embodiments, the first plurality of receiver antenna elements of the first receiver column 102 may be in electrical connection with one another. In various embodiments, the first receiver column 102 may include one or more electrical connections, e.g. one or more electrical lines, connecting the first plurality of receiver antenna elements. For instance, the first receiver column 102 may include an electrical line and the first plurality of receiver antenna elements may be arranged along the electrical line in a periodic manner. In various other embodiments, it may be envisioned that the first receiver column may include a single receiver antenna element.

In various embodiments, each of the plurality of second receiver columns may include a second plurality of receiver antenna elements (also referred to as a second plurality of receiver antennas). In various embodiments, a second plurality of receiver antenna elements included in each of the plurality of second receiver columns 104 may be in electrical connection with one another. In various embodiments, each of the plurality of second receiver columns 104 may include one or more electrical connections, e.g. one or more electrical lines, connecting the second plurality of receiver antenna elements. For instance, a second receiver column may include an electrical line and the second plurality of receiver antenna elements may be arranged along the electrical line in a periodic manner. In various other embodiments, it may be envisioned that each of the second receiver columns may include a single receiver antenna element.

In various embodiments, the first transmitter column may include a first plurality of transmitter antenna elements (also referred to as a first plurality of transmitter antennas). The first plurality of transmitter antenna elements included in the first transmitter column may be in electrical connection with one another. The first transmitter column may include one or more electrical connections, e.g. one or more electrical lines, connecting the first plurality of transmitter antenna elements. For instance, a first transmitter column may include an electrical line and the first plurality of transmitter antenna elements may be arranged along the electrical line in a periodic manner. In various other embodiments, it may be envisioned that the first transmitter column may include a single transmitter antenna element.

In various embodiments, the second transmitter column may include a second plurality of transmitter antenna elements (also referred to as a second plurality of transmitter antennas), The second plurality of transmitter antenna elements included in the second transmitter column may be in electrical connection with one another. The second transmitter column may include one or more electrical connections, e.g. one or more electrical lines, connecting the second plurality of transmitter antenna elements. For instance, a second transmitter column may include an electrical line and the second plurality of transmitter antenna elements may be arranged along the electrical line in a periodic manner. In various other embodiments, it may be envisioned that the second transmitter colon n may include a single transmitter antenna element.

In the present context, a first element "in electrical connection" with a second element may refer to the first element directly connected or in contact with the second element, or may be indirectly connected via one or more intermediate elements which allow a current to substantially pass through. Likewise, a first element "electrically connected" to a second element may refer to the first element directly connected or in contact with the second element, or may be indirectly connected via one or more intermediate elements which allow current to substantially pass through.

In various embodiments, the first plurality of receiver antenna elements of the first receiver column 102 may be the same as the second plurality of receiver antenna elements of the second receiver columns 104 in terms of number of elements, dimensions and/or material. Each of the first plurality of receiver antenna elements and each of the second plurality of receiver antenna elements may have the same dimensions and may include the same material. The first plurality of receiver antenna elements and the second plurality of receiver antenna elements may be antenna patches, and may be of any suitable shape, e.g. square, rectangle, circle etc. The first plurality of receiver antenna elements and the second plurality of receiver antenna elements may include a suitable metal or metal alloy such as copper, brass, bronze or aluminium. In various embodiments, the single receiver antenna element of the first receiver column may be the same as the single antenna elements of the second receiver columns in terms of number of elements, dimensions and/or material. The single receiver antenna element of the first receiver column and the single receiver antenna elements included in each of the second receiver columns may have the same dimensions and may include the same material. The single receiver antenna element of the first receiver column and the single receiver antenna elements included in each of the second receiver columns may be antenna patches, and may be of any suitable shape, e.g. square, rectangle, circle etc. The single receiver antenna element of the first receiver column and the single receiver antenna elements included in each of the second receiver columns may include a suitable metal or metal alloy such as copper, brass, bronze or aluminium. The receiver antenna elements/receiver columns may be electrically connected to or collected by a feeding network.

In various embodiments, the first plurality of transmitter antenna elements may be the same as the second plurality of transmitter antenna elements in terms of number of elements, dimensions and/or material. Each of the first plurality of transmitter antenna elements and each of the second plurality of transmitter antenna elements may have the same dimensions and may include the same material. The first plurality of transmitter antenna elements and the second plurality of transmitter antenna elements may be antenna patches, and may be of any suitable shape, e.g. square, rectangle, circle etc. The first plurality of transmitter antenna elements and the second plurality of transmitter antenna elements may include a suitable metal or metal alloy such as copper, brass, bronze or aluminium. In various embodiments, the first plurality of transmitter antenna elements and/or the second plurality of transmitter antenna elements may be the same as the first plurality of receiver antenna elements and/or the second plurality of receiver antenna elements (in terms of number of elements, dimensions and/or material). In various embodiments, the single transmitter antenna element of the first transmitter column may be the same as the single antenna element of the second transmitter column in terms of number of elements, dimensions and/or material. The single transmitter antenna element of the first transmitter column and the single transmitter antenna element of the second transmitter column may have the same dimensions and may include the same material. The single transmitter antenna element of the first transmitter column, and the single transmitter antenna element of the second transmitter column may be antenna patches, and may be of any suitable shape, e.g. square, rectangle, circle etc. The single transmitter antenna element of the first transmitter column and the single transmitter antenna element of the second transmitter column may include a suitable metal or metal alloy such as copper, brass, bronze or aluminium. The transmitter antenna elements/ transmitter columns may be electrically connected to a feeding network.

In various embodiments, the antenna array may include a first long range transmitter arrangement including a plurality of further transmitter columns. Each of the plurality of further transmitter columns may include a first plurality of long range transmitter antenna elements or antennas. The antenna array may also include a second long range transmitter arrangement including a plurality of additional transmitter columns, the second long range transmitter arrangement interdigitated with the first long range transmitter arrangement. Each of the plurality of the additional transmitter columns may include a second plurality of long range transmitter antenna elements or antennas. The first plurality of long range transmitter antenna elements and/or the second plurality of long range transmitter antenna elements may be antenna patches.

In various embodiments, the first plurality of long range transmitter antenna elements may be the same as the second plurality of long range transmitter antenna elements (in terms of number of elements, dimensions and/or material. The first plurality of long range transmitter antenna elements and the second plurality of long range transmitter antenna elements may be of any suitable shape, e.g. square, rectangle, circle etc., and may include a suitable metal or metal alloy such as copper, brass, bronze or aluminium. The first plurality of long range transmitter antenna elements and/or the second plurality of long range transmitter antenna elements may be the same as the first plurality of receiver antenna elements, the second plurality of receiver antenna elements, the first plurality of transmitter antenna elements, and/or or the second plurality of transmitter antenna elements ((in terms of number of elements, dimensions and/or material).

In various embodiments, the antenna array may form an equivalent virtual array of 8N−1 virtual channels.

Various embodiments may relate to an array arrangement. The array arrangement may include two azimuth packages including a first antenna array as described herein, each of the two azimuth packages including a monolithic microwave integrated circuit (MMIC) die. The array arrangement may also include a further azimuth package including a first long range transmitter arrangement and a second long range transmitter arrangement interdigitated with the first long range transmitter arrangement, the further azimuth package including a monolithic microwave integrated circuit (MMIC) die electrically connected to the monolithic microwave integrated circuit (MMIC) dies of the two azimuth packages. The array arrangement may further include two elevation packages including a second antenna array as described herein arranged orthogonal to the first antenna array, each of the two elevation packages including a monolithic microwave integrated circuit (MMIC) die. The array arrangement may also include a further elevation package orthogonal to the further azimuth package, the further elevation package including a further first long range transmitter arrangement and a further second long range transmitter arrangement interdigitated with the further first long range transmitter arrangement, the further elevation package including a monolithic microwave integrated circuit (MMIC) die electrically connected to the monolithic microwave integrated circuit (MMIC) dies of the two elevation packages.

In other words, the array arrangement may include two azimuth packages, in which the components of a first antenna array are distributed amongst the two azimuth packages. The array arrangement may also include a further azimuth package including long range transmitter arrangements. The array arrangement may include two elevation packages, in which the components of a second antenna array are distributed amongst the two elevation packages. The array arrangement may also include a further elevation package including long range transmitter arrangements. The further azimuth package and the further elevation package may each also include a MMIC die.

The two azimuth packages and the further azimuth package may be oriented in a first direction, while the two elevation packages and the further elevation package may be oriented in a second direction orthogonal or perpendicular to the first direction. The first receiver column, the plurality of second receiver columns, the first transmitter column, and the second transmitter column of the first antenna array may be arranged in the first direction, while the first receiver column, the plurality of second receiver column, the first transmitter column, and the second transmitter column of the second antenna array may be oriented in the second direction orthogonal or perpendicular to the first direction. Likewise, the transmitter columns of the first long range transmitter arrangement and the second long range transmitter arrangement of the further azimuth package may be oriented in the first direction, while the transmitter columns of the further first long range transmitter arrangement and the further second long range transmitter arrangement of the further elevation package may be oriented in the second direction.

In various embodiments, the array arrangement may include a first electrical connection, e.g. an electrical line, electrically connecting the monolithic microwave integrated circuit (MMIC) dies of the two azimuth packages. The array arrangement may also include a second electrical connection, e.g. an electrical line, electrically connecting the first electrical connection and the monolithic microwave integrated circuit (MMIC) die of the further azimuth package. The array arrangement may further include a third electrical connection, e.g. an electrical line, electrically connecting the monolithic microwave integrated circuit (MMIC) dies of the two elevation packages. The array arrangement may additionally include a fourth electrical connection, e.g. an electrical line, electrically connecting the third electrical connection and the monolithic microwave integrated circuit (MMIC) die of the further elevation package.

In various embodiments, the array arrangement may include a printed circuit hoard (PCB). The two azimuth packages, the further azimuth package, the two elevation packages and the further elevation package may be arranged over the printed circuit board.

In various embodiments, one azimuth package of the two azimuth packages may include the plurality of second receiver columns of the first antenna array, while another azimuth package of the two azimuth packages may include the first receiver column, the first transmitter column, and the second transmitter column of the first antenna array.

In various embodiments, one elevation package of the two elevation packages may include the plurality of second receiver columns of the second antenna array, while another elevation package of the two elevation packages may include the first receiver column, the first transmitter column, and the second transmitter column of the second antenna array.

Various other embodiments may relate to another array arrangement. The array arrangement may include two azimuth packages including a first antenna array as described herein, each of the two azimuth packages including a monolithic microwave integrated circuit (MMIC) die. The array arrangement may include a further azimuth package including a first long range transmitter arrangement and a second long range transmitter arrangement interdigitated with the first long range transmitter arrangement, the first long range transmitter arrangement and the second long range transmitter arrangement electrically connected to at least one monolithic microwave integrated circuit (MMIC) die of the monolithic microwave integrated circuit (MMIC) dies included in the two azimuth packages. The array arrangement may also include two elevation packages including a second antenna array as described herein arranged orthogonal to the first antenna array, each of the two elevation packages including a monolithic microwave integrated circuit (MMIC) die electrically connected to the monolithic microwave integrated circuit (MMIC) dies of the two azimuth packages. The array arrangement may include a further elevation package orthogonal to the further azimuth package, the further elevation package including a further first long range transmitter arrangement and a further second long range transmitter arrangement interdigitated with the further first long range transmitter arrangement, the further first long range transmitter arrangement and the further second long range transmitter arrangement electrically connected to at least one monolithic microwave integrated circuit (MMIC) die of the monolithic microwave integrated circuit (MMIC) dies included in the two elevation packages.

In other words, the array arrangement may include two azimuth packages, in which the components of a first antenna array are distributed amongst the two azimuth packages. The array arrangement may also include a further azimuth package including long range transmitter arrangements. The array arrangement may include two elevation packages, in which the components of a second antenna array are distributed amongst the two elevation packages. The array arrangement may also include a further elevation package including long range transmitter arrangements. The further azimuth package and the further elevation package may not include a MMIC die.

The two azimuth packages and the further azimuth package may be oriented in a first direction while the two elevation packages and the further elevation package may be oriented in a second direction orthogonal or perpendicular to the first direction. The first receiver column, the plurality of second receiver columns, the first transmitter column, and the second transmitter column of the first antenna array may be arranged in the first direction, while the first receiver column, the plurality of second receiver column, the first transmitter column, and the second transmitter column of the second antenna array may be oriented in the second direction orthogonal or perpendicular to the first direction. Likewise, the transmitter columns of the first long range transmitter arrangement and the second long range transmitter arrangement of the further azimuth package may be oriented in the first direction, while the transmitter columns of the further first long range transmitter arrangement and the further second long range transmitter arrangement of the further elevation package may be oriented in the second direction.

In various embodiments, the array arrangement may include a first electrical connection, e.g. an electrical line, electrically connecting the monolithic microwave integrated circuit (MMIC) dies of the two azimuth packages and the monolithic microwave integrated circuit (MMIC) dies of the two elevation packages. The array arrangement may also include a second electrical connection, e.g. an electrical line, electrically connecting the first long range transmitter arrangement of the further azimuth package to one of the monolithic microwave integrated circuit (MMIC) dies of the two elevation packages. The array arrangement may additionally include a third electrical connection, e.g. an electrical line, electrically connecting the second long range transmitter arrangement of the further azimuth package to one of the monolithic microwave integrated circuit (MMIC) dies of the two elevation packages. The array arrangement may also include a fourth electrical connection, e.g. an electrical line, electrically connecting the further first long range transmitter arrangement of the further elevation package to one of the monolithic microwave integrated circuit (MMIC) dies of the two azimuth packages. The array arrangement may further include a fifth electrical connection, e.g. an electrical line, electrically connecting the further second long range transmitter arrangement of the further elevation package to one of the monolithic microwave integrated circuit (MMIC) dies of the two azimuth packages.

In various embodiments, the array arrangement may include a printed circuit board (PCB). The two azimuth packages, the further azimuth package, the two elevation packages and the further elevation package may be arranged over the printed circuit board.

In various embodiments, one azimuth package of the two azimuth packages may include the plurality of second receiver columns of the first antenna array. Another azimuth package of the two azimuth packages may include the first receiver column, the first transmitter column, and the second transmitter column of the first antenna array.

In various embodiments, one elevation package of the two elevation packages may include the plurality of second receiver columns of the second antenna array. Another elevation package of the two elevation packages may include the first receiver column, the first transmitter column, and the second transmitter column of the second antenna array.

FIG. 2 is a general illustration of a method of forming an antenna array according to various embodiments. The method may include, in 202, providing or forming a first receiver column. The method may also include, in 204, providing or forming a plurality of second receiver columns. The method may additionally include, in 206, providing or forming a first transmitter column and a second transmitter column arranged between the first receiver column and the plurality of second receiver columns. A spacing between the first transmitter column and the second transmitter column may be about half a spacing between neighbouring second receiver columns of the plurality of second receiver columns. A distance between the first receiver column and a second receiver column of the plurality of second receiver columns nearest to the first receiver column may be about N times the spacing between the neighbouring second receiver columns of the plurality of second receiver columns, N being a number of second receiver columns.

In other words, the method may include providing a forming or providing the first receiver column, the plurality of second receiver columns, the first transmitter column and the second transmitter column.

For avoidance of doubt, FIG. 2 is not intended to limit the sequence of the various steps. For instance, step 202 may occur before, after, or at the same time as step 204.

In various embodiments, the method may include providing a first long range transmitter arrangement including a plurality of further transmitter columns. The method may also include providing a second long range transmitter arrangement including a plurality of additional transmitter columns, the second long range transmitter arrangement interdigitated with the first long range transmitter arrangement.

In various embodiments, the antenna array may form an equivalent virtual array of 8N−1 virtual channels.

Various embodiments may relate to a method of forming an array arrangement. The method may include providing two azimuth packages including a first antenna array as described herein, each of the two azimuth packages including a monolithic microwave integrated circuit (MMIC) die. The method may include providing a further azimuth package including a first long range transmitter arrangement and a second long range transmitter arrangement interdigitated with the first long range transmitter arrangement, the further azimuth package including a monolithic microwave integrated circuit (MMIC) die electrically connected to the monolithic microwave integrated circuit (MMIC) dies of the two azimuth packages. The method may additionally include providing two elevation packages including a second antenna array as described herein, the second antenna array arranged orthogonal to the first antenna array, each of the two elevation packages including a monolithic microwave integrated circuit (MMIC) die. The method may additionally include providing a further elevation package orthogonal to the further azimuth package, the further elevation package including a further first long range transmitter arrangement and a further second long range transmitter arrangement interdigitated with the further first long range transmitter arrangement, the further elevation package including a monolithic microwave integrated circuit (MMIC) die electrically connected to the monolithic microwave integrated circuit (MMIC) dies of the two elevation packages.

Various embodiments may relate to a method of forming an array arrangement. The method may include providing two azimuth packages including a first antenna array as described herein, each of the two azimuth packages including a monolithic microwave integrated circuit (MMIC) die. The method may also include providing a further azimuth package including a first long range transmitter arrangement and a second long range transmitter arrangement interdigitated with the first long range transmitter arrangement, the first long range transmitter arrangement and the second long range transmitter arrangement electrically connected to at least one monolithic microwave integrated circuit (MMIC) die of the monolithic microwave integrated circuit (MMIC) dies included in the two azimuth packages. The method may additionally include providing two elevation packages including a second antenna array as described herein, the second antenna array arranged orthogonal to the first antenna array, each of the two elevation packages including a monolithic microwave integrated circuit (MMIC) die electrically connected to the monolithic microwave integrated circuit (MMIC) dies of the two azimuth packages. The method may further include providing a further elevation package orthogonal to the further azimuth package, the further elevation package including a further first long range transmitter arrangement and a further second long range transmitter arrangement interdigitated with the further first long range transmitter arrangement, the further first long range transmitter arrangement and the further second long range transmitter arrangement electrically connected to at least one monolithic microwave integrated circuit (MMIC) die of the monolithic microwave integrated circuit (MMIC) dies included in the two elevation packages.

Various embodiments may relate to an antenna array layout suitable for implementation in package for mmWave radar. In the antenna array layout, space may be saved by embedding the transmitter antenna array into the receiver antenna array. Meanwhile, the same degree of freedom (DoF) may be achieved with less than half number of radio frequency (RF) channels compared with the common MIMO antenna array. An array including or consisting of 2 physical transmission (Tx) channels and N+1 receiving (Rx) physical channels. Based on that, 8N−1 virtual channels may be achieved, which is much larger than conventional uniform linear array (ULA) MIMO having 2(N+1) virtual channels with the same number of physical channels. Meanwhile, the antenna array layout may have a minimum size of $2(N-1)/\lambda$.

Various embodiments may also relate to the corresponding MIMO virtual element recovery algorithm. Various embodiments may also relate to the arrangement of arrays for 2-dimensional (2-D) DoA estimation. Various embodiments may relate to detailed antenna design for the implementation in integrated circuit (IC) packages with consideration of the package size.

Figure 3B:
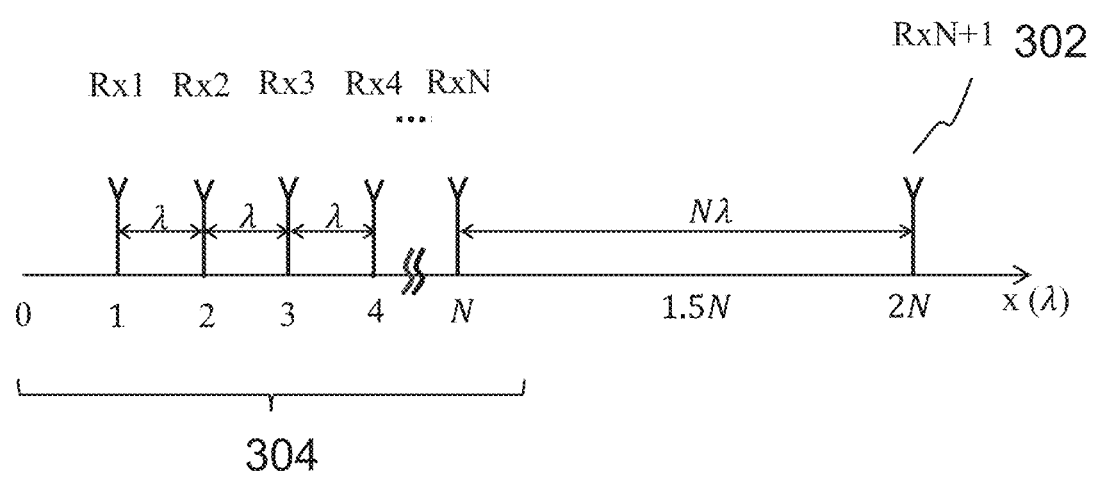
FIG. 3B shows an antenna array layout including a first antenna (RxN+1) and a one-dimensional arrangement of second antennas (Rx1, Rx2, Rx3, Rx4, . . . RxN) according to various embodiments.

FIG. 3A shows an antenna array layout including two transmitter antennas 306a, 306b (Tx1 and Tx2) according to various embodiments. FIG. 3B shows an antenna array layout including a first antenna 302 (RxN+1) and a one-dimensional arrangement of second antennas 304 (Rx1, Rx2, Rx3, Rx4 . . . RxN) according to various embodiments. The spacing between adjacent antennas or channels among the arrangement of second antennas 304 (Rx1 to RxN) may be one wavelength ($\lambda$) of the working radio frequency (RF) (as measured in air). The spacing between RxN and Rx(N+1) may be $N\lambda$. The spacing between the two transmitter antennas 306a, 306b may be $\lambda/2$. The transmitter antenna array and receiver antenna array may have the same polarization direction.

Figure 4:
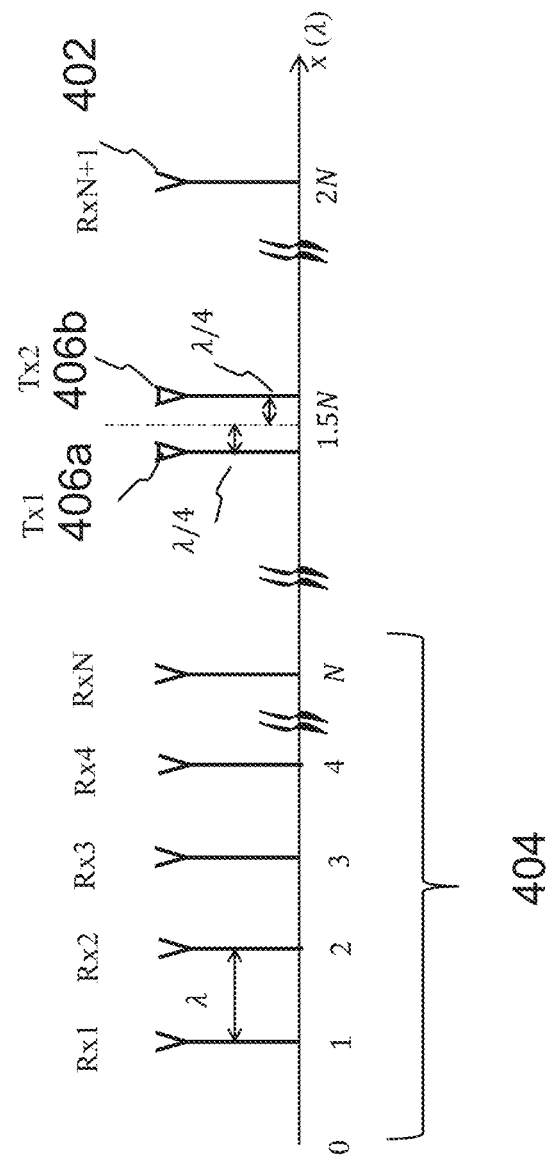
FIG. 4 is a schematic showing a side view of an antenna array including two transmitter antennas 406a, 406b (Tx1, Tx2), a first receiver antenna 402 (Rx(N+1)), and a plurality of second receiver antennas 404 (Rx1, Rx2, Rx3, Rx4 . . . RxN) according to various embodiments.

Usually, the antenna elements of the transmitter antenna array and the receiver antenna array should have enough gap to avoid large direct leakage. Since the transmitter antenna array has only 2 antennas or channels 306a, 306b with $\lambda/2$ spacing, and there is a big gap between the receiver antennas or channels 302, 304 (i.e. between PAN and Rx(N+1)) in the receiver antenna array, the transmitter antenna array may be embedded in the receiver array in accordance to various embodiments, while keeping enough space between any channels of transmitter antenna array and receiver antenna array as shown in FIG. 4. FIG. 4 is a schematic showing a side view of an antenna array including two transmitter antennas 406a, 406b (Tx1, Tx2), a first receiver antenna 402 (Rx(N+1)), and a plurality of second receiver antennas 404 (Rx1, Rx2, Rx3, Rx4 . . . RxN) according to various embodiments.

The two transmitter antennas 406a, 406b (Tx1, Tx2) may be placed in the centre between the RxN and Rx(N+1) to minimize the direct leakage between transmitter antennas 406a, 406b and receiver antennas 402, 404 as well as to save space.

Physically, along the x-axis, the antenna array may have the strict spacing requirement as shown in FIGS. 3A-B. To achieve higher antenna gain, it is usually required to have larger size with combination of multiple antenna elements for one channel. In this case, multiple antenna elements for each receiver or transmitter channel can be arranged in the direction orthogonal with X-axis as shown in FIG. 5.

Figure 5:
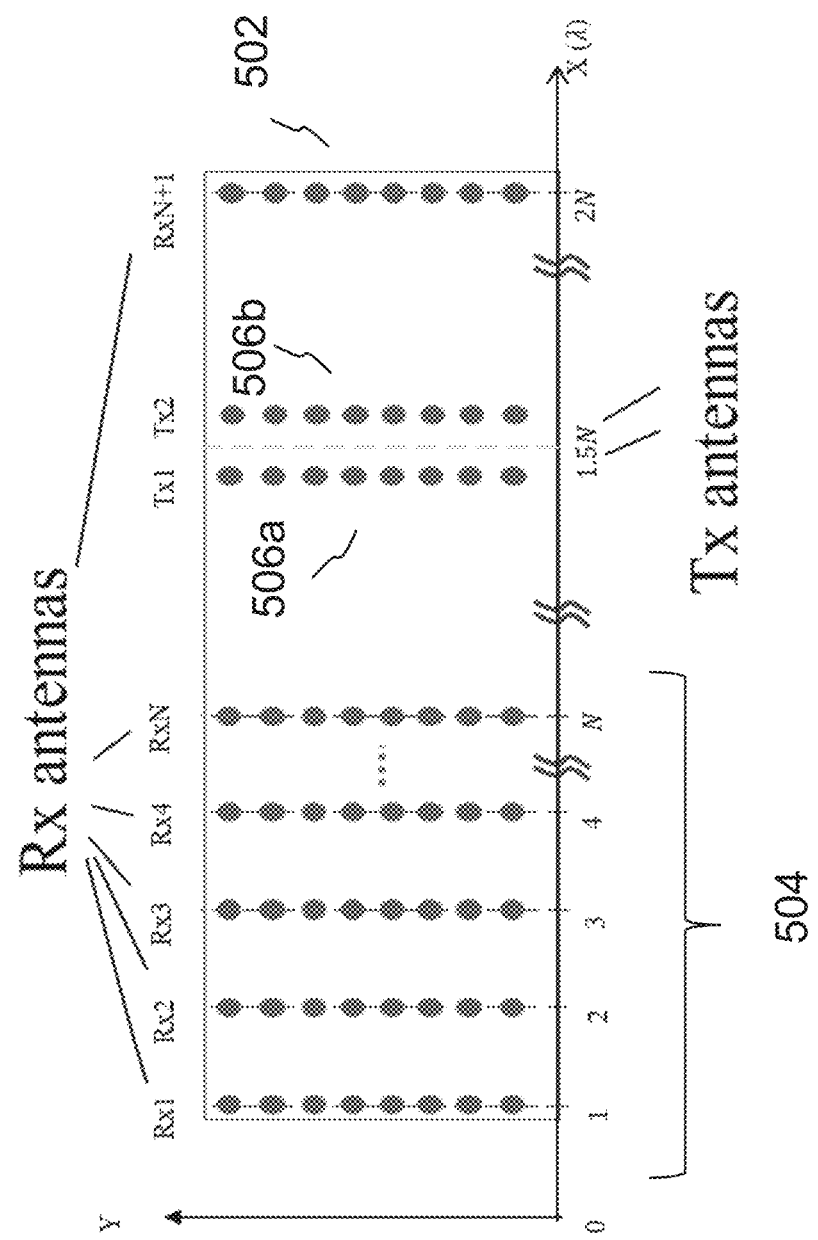
FIG. 5 is a schematic showing a top planar view of an antenna array according to various embodiments.

FIG. 5 is a schematic showing a top planar view of an antenna array according to various embodiments.

In FIG. 5, each circle represents an antenna element (also referred to as radiator element). Multiple radiator elements along the Y direction may be combined together to form a column for achieving higher antenna gain. Note that the array in FIG. 5 may have higher directivity in dimension Y than dimension X.

The antenna array may include a first receiver column 502. The antenna array may also include a plurality of second receiver columns 504. The antenna array may also include a first transmitter column 506a and a second transmitter column 506b arranged between the first receiver column 502 and the plurality of second receiver columns 504. A spacing between the first transmitter column 506a and the second transmitter column 506b may be about half a spacing between neighbouring second receiver columns of the plurality of second receiver columns 504. A distance between the first receiver column 502 and a second receiver column of the plurality of second receiver columns 504 nearest to the first receiver column 502 may be about N times the spacing between the neighbouring second receiver columns of the plurality of second receiver columns 504, N being a number of second receiver columns. In various embodiments, the number of antenna elements in columns 502, 506a, 506b and each of columns 504 may be equal.

As shown in FIG. 5, the antenna elements or radiators in a column may be collected through a feeding network (designed electrical lines). An electrical line of the feeding network may run or pass through the antenna elements or radiators of the column. An electrical line of the feeding network may pass through the antenna elements or radiators of antenna column 502, while each of columns 504 may each have an electrical line of the feeding network passing through the antenna elements or radiators of the respective column. Similar, an electrical line of another feeding network may pass through the antenna elements or radiators of the first transmitter column 506a, while another electrical line of the other feeding network may pass through the antenna elements or radiators of the second transmitter column 506b.

The layout in FIG. 5 is enough if the requirements for transmitter antenna gain and the directivity in dimension X is low, for example, the short-range radar (SRR) or middle-range radar (MRR). However, if the transmitter antenna array is required to have high gain and high directivity in the dimension X, for example, the long-range radar (LRR), a bigger size in dimension X may be required.

Figure 6:
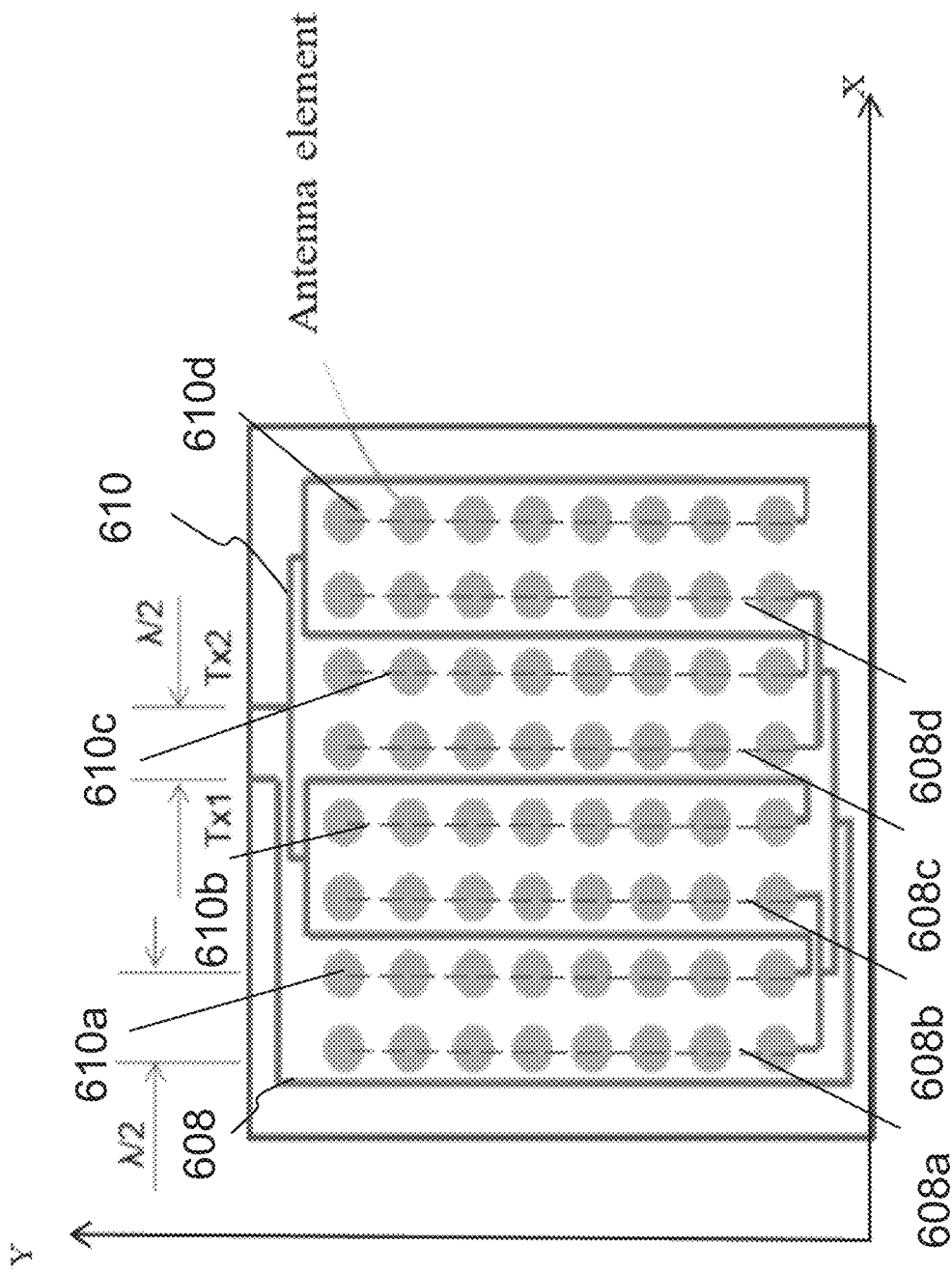
FIG. 6 is a schematic showing a top planar view of a transmitter antenna array layout according to various embodiments.

FIG. 6 is a schematic showing a top planar view of a transmitter antenna array layout according to various embodiments. The antenna layout may include a first long range transmitter arrangement 608 include a plurality of further transmitter columns 608a-d. The antenna layout may also include a second long range transmitter arrangement 610 include a plurality of additional transmitter columns 610a-d, the second long range transmitter 610 arrangement interdigitated with the first long range transmitter arrangement 608. For instance, the additional transmitter column 610a may be between two further transmitter columns 608a, 608b. Likewise, the further transmitter column 608b may be between two additional transmitter columns 610a, 610b. While FIG. 6 shows that the first long range transmitter arrangement 608 has four columns 608a-d, and the second long range transmitter arrangement 610 has four columns 610a-d, it may be envisioned that the arrangements 608, 610 may have 2, 3, or any suitable number of columns.

Each of the plurality of further transmitter columns 608a-d may include a plurality of antenna elements, which each of the plurality of the additional transmitter columns 610a-d may also include a plurality of antenna elements. In various embodiments, the number of antenna elements in each of columns 608a-d may be equal to the number of antenna elements in each of columns 610a-d.

The antenna elements in each of columns 608a-d may be in electrical connection to one another. Likewise, the antenna elements in each of columns 610a-d may be in electrical connection to one another. The electrical lines passing columns 608a-d may be joined together to form the comb-shaped arrangement 608 with columns 608a-d as the fingers. Likewise, the electrical lines passing columns 610a-d may be joined together to form the comb-shaped arrangement 610 with columns 610a-d as the fingers. The first long range transmitter arrangement 608 may not be electrically connected to the second long range transmitter arrangement 610.

For the structure shown in FIG. 6, although more antenna elements in dimension X are combined and the size in dimension X is enlarged a lot, the equivalent space between Tx1 and Tx2 may still be $\lambda/2$. In other words, the distance between a column (of one arrangement) and a neighbouring column (of another arrangement) may be $\lambda/2$. For instance, the distance between column 608a and column 610a may be $\lambda/2$, and the distance between column 610a and 608b may also be $\lambda/2$.

This may lead to the higher directivity in dimension X and higher gain as compared to the array shown in FIG. 5.

Tx1 and Tx2 may emit orthogonal signals. $r_{n1}$ denotes the received signal of the reflection corresponding to the transmission of Tx1 at receiver n, while $r_{n2}$ is the received signal of the reflection related to the transmission of Tx2 at receiver n. After receiving a set of signals at all receiver antennas related to transmissions of the two transmitters, the received signal may be aligned as a sequence $r_{11}, r_{12}, \ldots, r_{(N+1)1}, r_{(N+1)2}$, and the sequence as a vector $\vec{r} \in R^{2(N+1) \times 1}$ may be defined:

$$\vec{r} = [r_{11}, r_{12}, \ldots, r_{(N+1)1}, r_{(N+1)2}]^T \quad (1)$$

where $[\bullet]^T$ means transpose. Let the correlation matrix be $$C = \vec{r} \cdot \vec{r}^g = \begin{bmatrix} c_{1,1} & \cdots & c_{1,2(N+1)} \\ \vdots & & \vdots \\ c_{2(N+1),1} & \cdots & c_{2(N+1),2(N+1)} \end{bmatrix} \quad (2)$$

Figure 7:
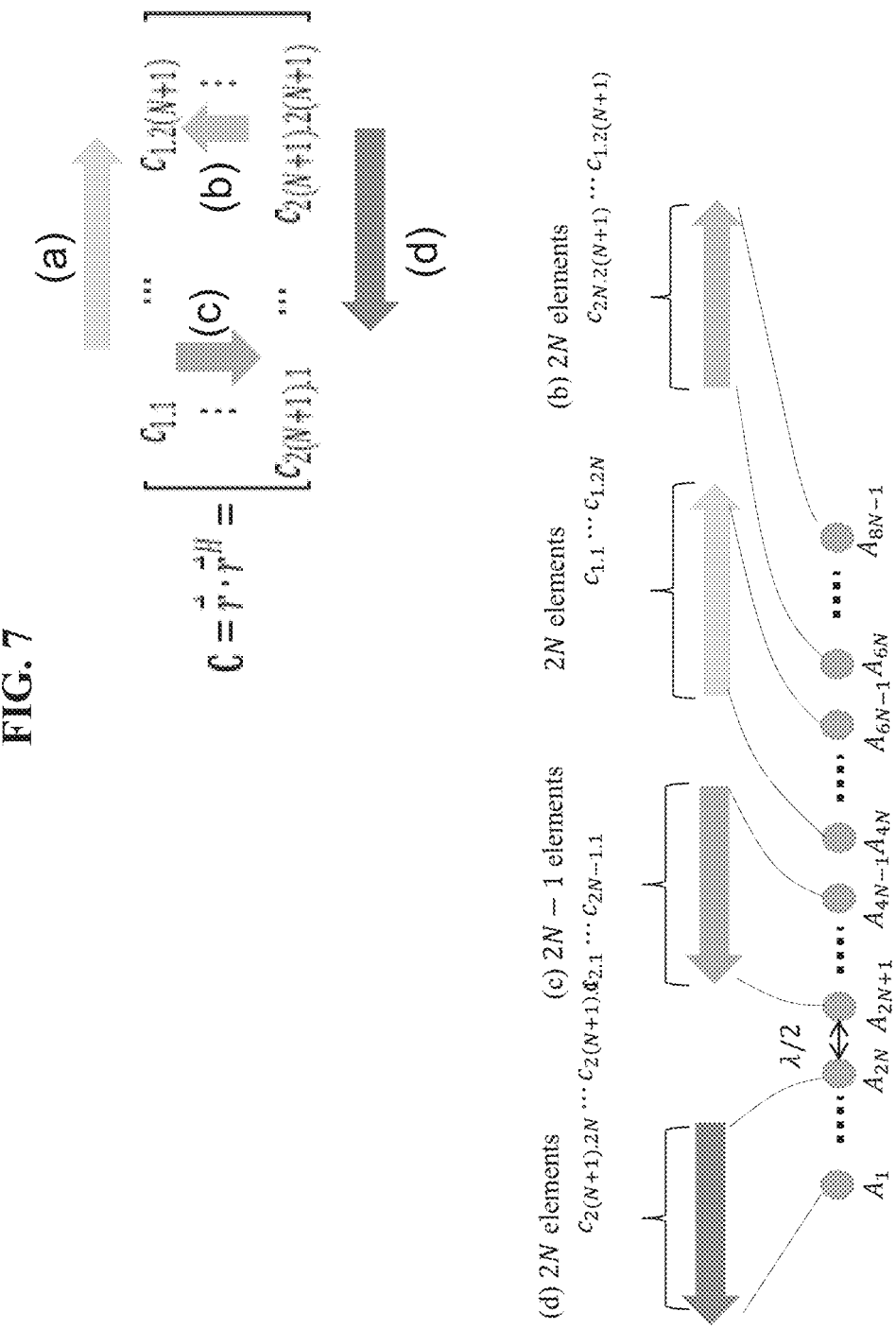
FIG. 7 shows the equivalent virtual array and the associated correlation matrix according to various embodiments.

The equivalent virtual array can be recovered by calculating the 4 edges of the correlation matrix in the equation (2) as shown in FIG. 7. FIG. 7 shows the equivalent virtual array and the associated correlation matrix according to various embodiments. The space between two adjacent elements in FIG. 7 is half wavelength.

The number of elements in the equivalent virtual array may be 8N−1. The equivalent size may be $(8N-1)\lambda/2$. $A_1$ to $A_{8N-1}$ in FIG. 7 is the recovered virtual elements of the MIMO radar.

The equivalent virtual array may be recovered by the full correlation matrix in the Equation (2), namely Khatri-Rao (KR) product. However, many virtual elements may repeatedly be calculated multiple times and the numbers of repeats for different virtual elements may be different to one another. It should be inversely weighted out.

Figure 8:
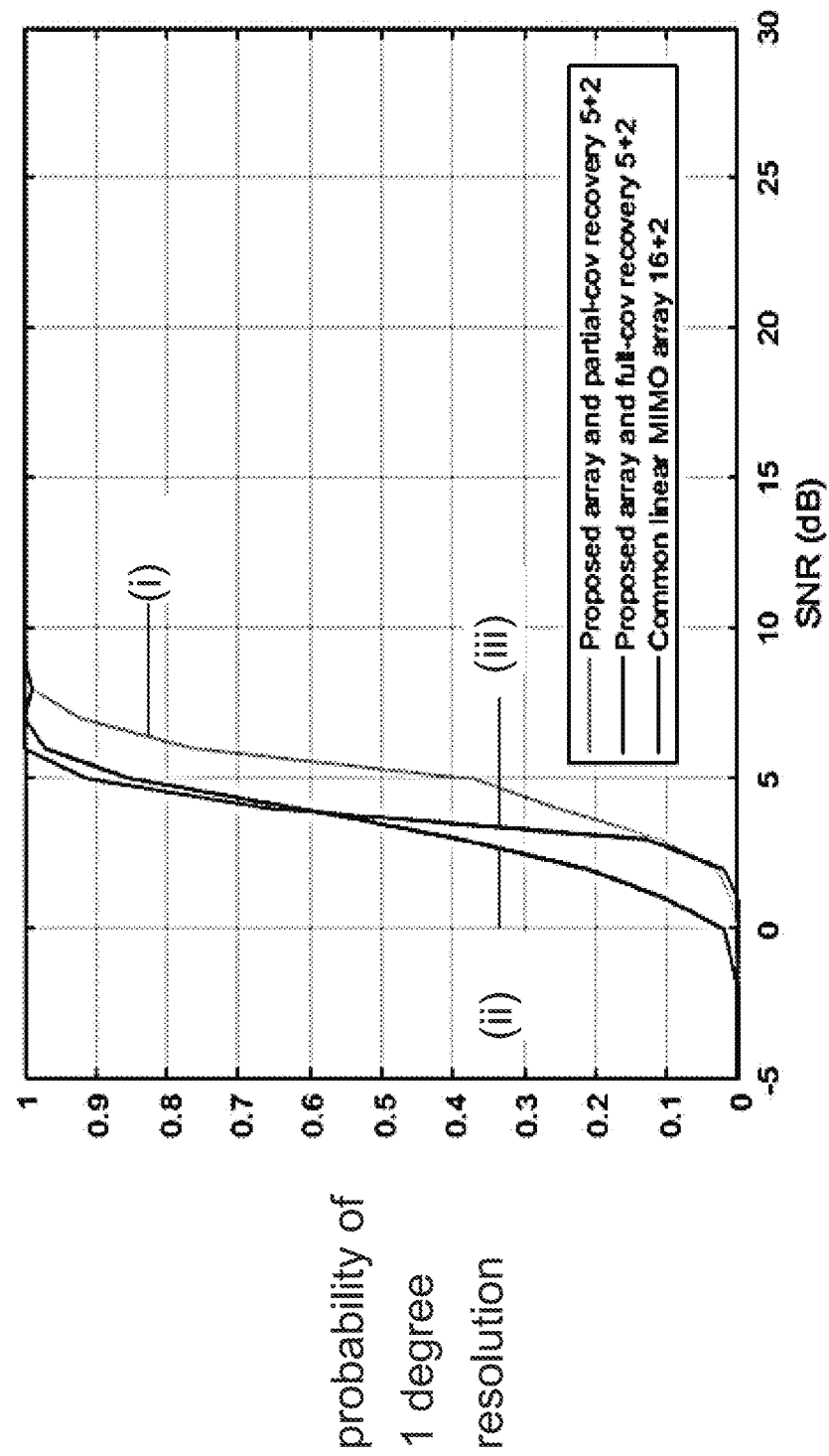
FIG. 8 is a plot of probability of one degree resolution as a function of signal to noise ratio (SNR) (in decibels or dB) illustrating the simulation results of the direction of arrival (DoA) detection of (i) an antenna array having 5+2 channels and partial correlation recovery according to various embodiments, (ii) an antenna array having 5+2 channels and full correlation recovery according to various embodiments, and (iii) a conventional linear antenna array with 16+2 channels with full correlation matrix recovery.

FIG. 8 is a plot of probability of one degree resolution as a function of signal to noise ratio (SNR) (in decibels or dB) illustrating the simulation results of the direction of arrival (DoA) detection of (i) an antenna array having 5+2 channels and partial correlation recovery according to various embodiments, (ii) an antenna array having 5+2 channels and full correlation recovery according to various embodiments, and (iii) a conventional linear antenna array with 16+2 channels with full correlation matrix recovery. The proposed antenna array with 5+2 channels and full correlation recovery according to various embodiments may have similar performance of the common linear array with 16+2 channels. With the partial correlation matrix (4 edges) based recovery, the DoA detection may need 2 dB SNR higher. The benefit is the computation may be reduced to ⅓ of the full correlation matrix based recovery.

Figure 9:
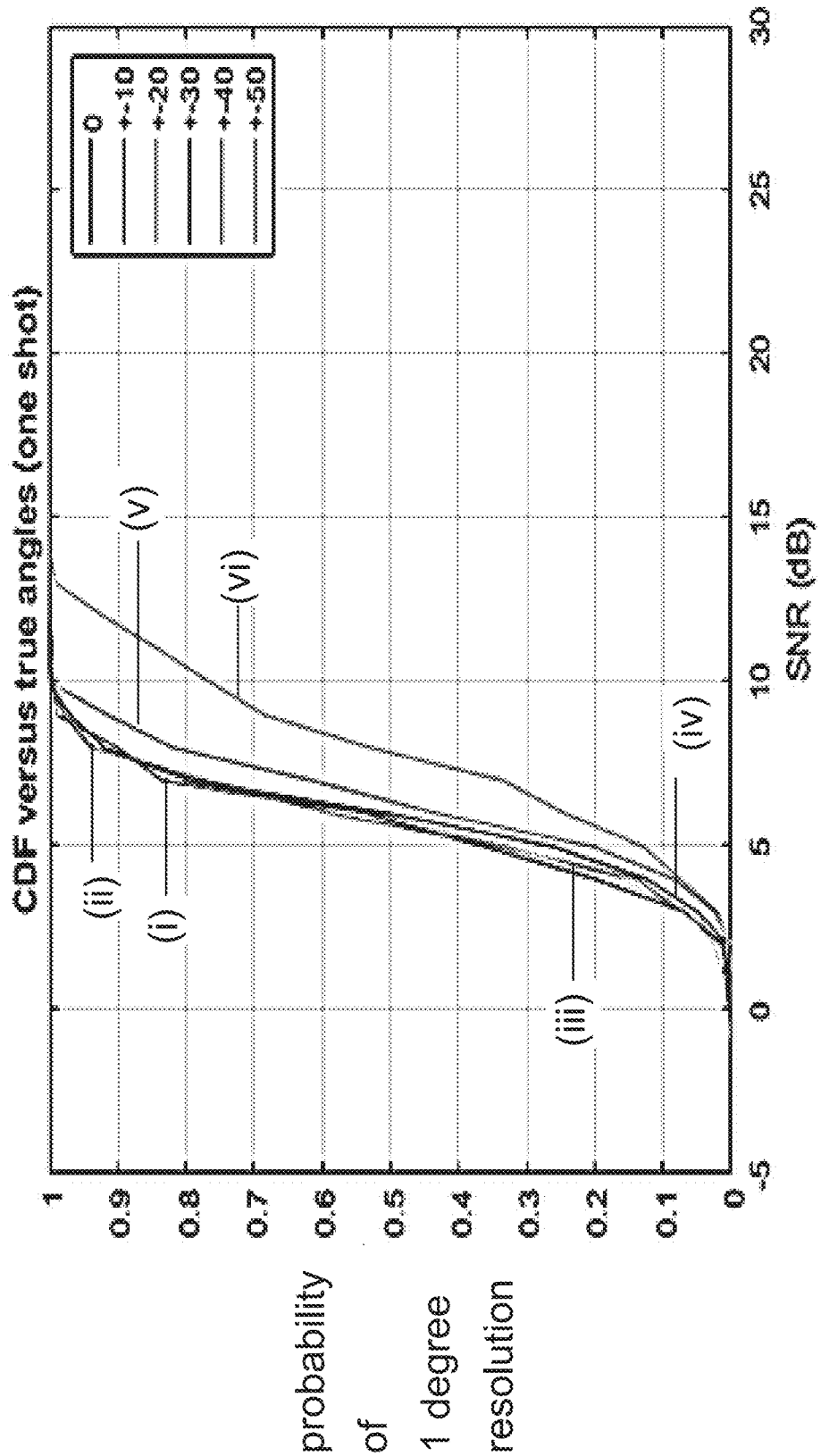
FIG. 9 is a plot of probability of one degree resolution as a function of signal to noise ratio (SNR) (in decibels or dB) illustrating the direction of arrival (DoA) detection performance in difference directions ((i) 0 degree: (ii) ±10 degrees; (iii) ±20 degrees; (iv) ±30 degrees; (v) ±40 degrees; (vi) ±50 degrees) according to various embodiments.

FIG. 9 is a plot of probability of one degree resolution as a function of signal to noise ratio (SNR) (in decibels or dB) illustrating the direction of arrival (DoA) detection performance in difference directions ((i) 0 degree; (ii) ±10 degrees; (iii) ±20 degrees; (iv) ±30 degrees; (v) ±40 degrees; (vi) ±50 degrees) according to various embodiments. In order to achieve 1-degree resolution, the directions away from the center may require higher SNR compared to the centre direction. However, within +−30 degrees, the difference may not be significant.

Various embodiments may reduce the number of channels from 16+2 to 5+2, but may provide equal or similar performance compared with the common linear array of DoA detection through full correlation matrix based recovery. When partially correlation matrix based virtual element recovery is used, ⅔ computation of the full correlation matrix based virtual element recovery may be saved. The trade-off may be 2 dB higher requirement of SNR.

In automotive applications, it may be desirable to know the DoA in both the azimuth dimension and the elevation dimension. Thus, two sets of antenna arrays as mentioned herein may be arranged in right angles for DoA detections in the azimuth direction and in the elevation direction. One set may be used for DoA detection in the azimuth direction, while another set may be used for DoA detection in the elevation direction.

Moreover, the middle-range radar (MRR) and the long-range radar (LRR) may be integrated together. To reduce the direct leakage, the transmitter antenna elements may be arranged far away from the receiver antenna elements. Meanwhile, the total size of the combined array may be reduced or minimized with consideration of the package size limitation.

Figure 10:
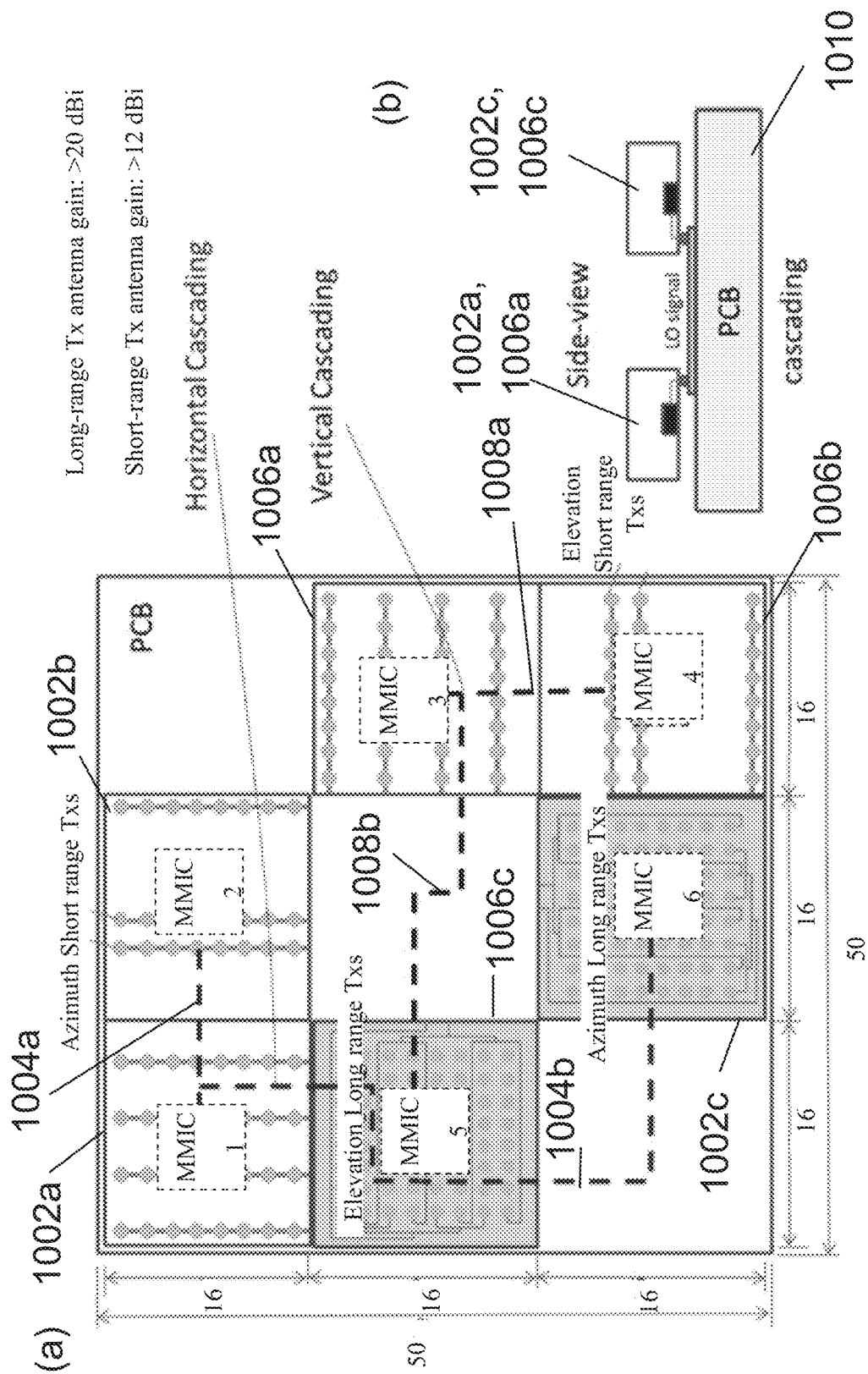
FIG. 10 shows (a) a two dimensional (2D) array arrangement according to various embodiments, (b) a cross-sectional side view of a part of the arrangement according to various embodiments.

The first type of two dimensional (2D) array arrangement may assume that the integrated circuit (IC) package size is 16 mm×16 mm, and each package may contain maximum one radar monolithic microwave integrated circuit (MMIC) die. FIG. 10 shows (a) a two dimensional (2D) array arrangement according to various embodiments, (b) a cross-sectional side view of a part of the arrangement according to various embodiments. The dimensions shown in FIG. 10 are in millimeters (mm). The arrangement may have the maximum dimension of 5 cm (i.e. 50 mm), The area may be 25 cm². Each package may include one MMIC die and azimuth and elevation arrays may be cascaded separately.

As shown in FIG. 10, the array arrangement may include two azimuth packages 1002*a-b* including a first antenna array as described herein, each of the two azimuth packages including a monolithic microwave integrated circuit (MMIC) die. The azimuth package 1002*a* may include MMIC 1, while the azimuth package 1002*b* may include MMIC 2. As shown in FIG. 10, one azimuth package, i.e. package 1002*a*, of the two azimuth packages may include the plurality of second receiver columns of the first antenna array, while another azimuth package, i.e. package 1002*b*, of the two azimuth packages may include the first receiver column, the first transmitter column, and the second transmitter column of the first antenna array. The first transmitter column and the second transmitter column of the first antenna array may serve as azimuth short range transmitters.

The array arrangement may further include a further azimuth package 1002*c* including a first long range transmitter arrangement and a second long range transmitter arrangement interdigitated with the first long range transmitter arrangement, the further azimuth package including a monolithic microwave integrated circuit (MMIC) die (MMIC 6) electrically connected to the monolithic microwave integrated circuit (MMIC) dies (MMIC 1, MMIC 2) of the two azimuth packages 1002*a-b*. The further azimuth package 1002*c* and the azimuth packages 1002*a-b* may be on opposing sides of the array arrangement.

The arrangement may include a first electrical connection 1004*a* electrically connecting the monolithic microwave integrated circuit (MMIC) dies (MMIC 1, MMIC 2) of the two azimuth packages 1002*a-b*, and a second electrical connection 1004*b* electrically connecting the first electrical connection 1004*a* and the monolithic microwave integrated circuit (MMIC) die (MMIC 6) of the further azimuth package 1002*c*. In this arrangement, the electrical connections between different dies may can), only local oscillator (LO) signals. There may be no need for RF signal connection between different packages.

The arrangement may also include two elevation packages 1006*a-b* including a second antenna array as described herein arranged orthogonal to the first antenna array, each of the two elevation packages 1006*a-b* including a monolithic microwave integrated circuit (MMIC) die. The elevation package 1006*a* may include MMIC 3, while the elevation package 1006*b* may include MMIC 4.

One elevation package, i.e. package 1006*a*, of the two elevation packages may include the plurality of second receiver columns of the second antenna array, while another elevation package, i.e. package 1006*b*, of the two elevation packages may include the first receiver column, the first transmitter column, and the second transmitter column of the second antenna array. The first transmitter column and the second transmitter column of the second antenna array may serve as elevation short range transmitters.

The array arrangement may additionally include a further elevation package 1006*c* orthogonal to the further azimuth package 1002*c*, the further elevation package 1006*c* including a further first long range transmitter arrangement and a further second long range transmitter arrangement interdigitated with the further first long range transmitter arrangement, the further elevation package including a monolithic microwave integrated circuit (MMIC) die (MMIC 5) electrically connected to the monolithic microwave integrated circuit (MMIC) dies (MMIC 3, MMIC 4) of the two elevation packages 1006*a-b*. The further elevation package 1006*c* and the elevation packages 1006*a-b* may be on opposing sides of the array arrangement.

The arrangement may include a third electrical connection 1008*a* electrically connecting the monolithic microwave integrated circuit (MMIC) dies (MMIC 3, MMIC 4) of the two elevation packages 1006*a-b*. The arrangement may also include a fourth electrical connection 1008*b* electrically connecting the third electrical connection 1008*a* and the monolithic microwave integrated circuit (MMIC) die (MMIC 5) of the further elevation package 1006*c*.

The arrangement may include a printed circuit board (PCB) 1010, and the packages 1002*a-c*, 1006*a-c* may be arranged over the PCB 1010. The electrical connections 1004*a-b*, 1008*a-b* may be on or within the PCB 1010, and may be configured to carry LO signals.

Figure 11:
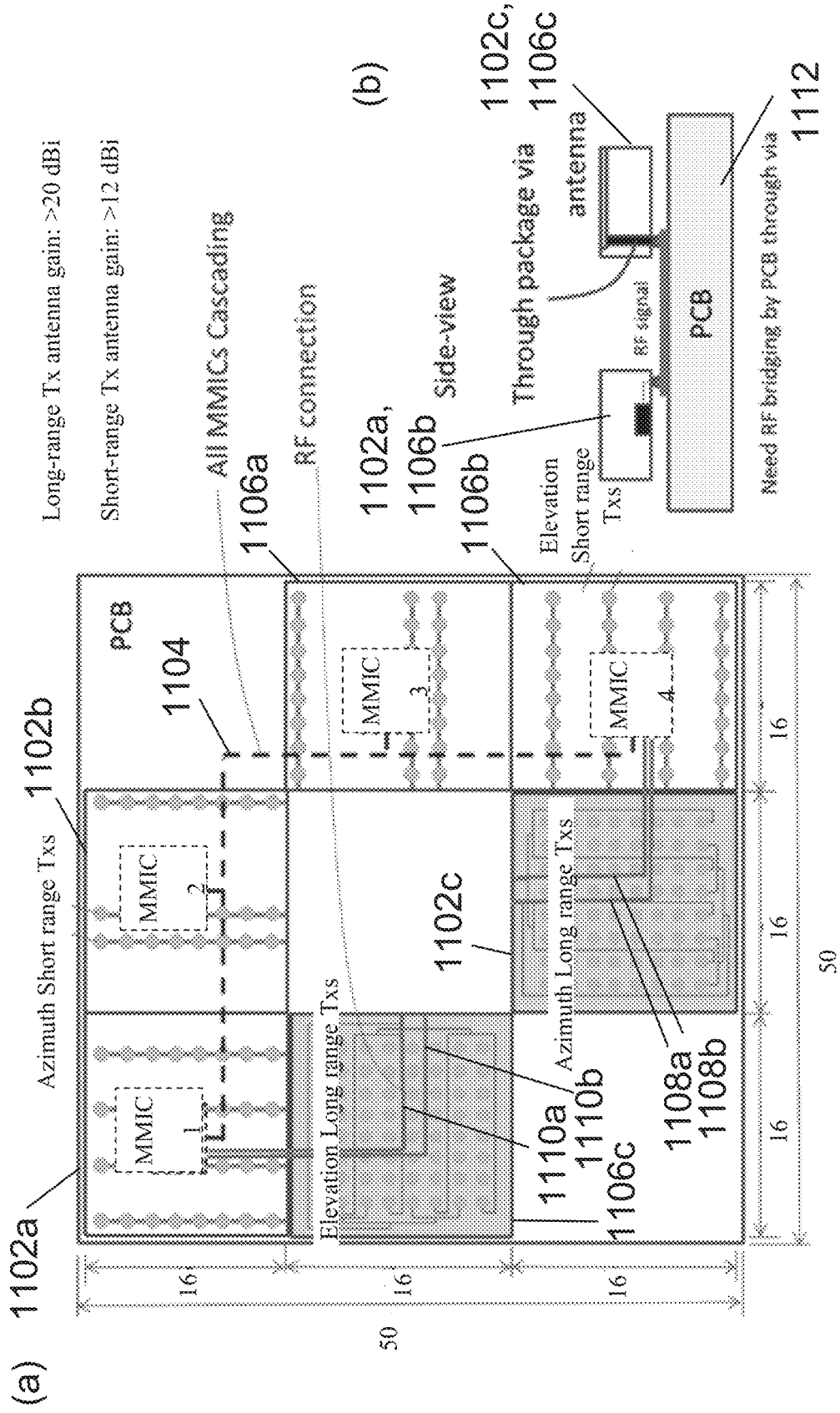
FIG. 11 shows (a) a two dimensional (2D) array arrangement according to various other embodiments, (b) a cross-sectional side view of a part of the arrangement according to various other embodiments.

FIG. 11 shows (a) a two dimensional (2D) array arrangement according to various other embodiments, (b) a cross-sectional side view of a part of the arrangement according to various other embodiments.

The array arrangement may include two azimuth packages 1102*a-b* including a first antenna array as described herein, each of the two azimuth packages 1102*a-b* including a monolithic microwave integrated circuit (MMIC) die (i.e. MMIC 1, MMIC 2). The azimuth package 1102*a* may include MMIC 1, while the azimuth package 1102*b* may include MMIC 2. As shown in FIG. 11, one azimuth package, i.e. package 1102*a*, of the two azimuth packages may include the plurality of second receiver columns of the first antenna array, while another azimuth package, i.e. package 1102*b*, of the two azimuth packages may include the first receiver column, the first transmitter column, and the second transmitter column of the first antenna array. The first transmitter column and the second transmitter column of the first antenna array may serve as azimuth short range transmitters.

The array arrangement may include two elevation packages 1106*a-b* including a second antenna array as described herein arranged orthogonal to the first antenna array, each of the two elevation packages 1106*a-b* including a monolithic microwave integrated circuit (MMIC) die (i.e. MMIC 3, MMIC 4) electrically connected to the monolithic microwave integrated circuit (MMIC) dies (MMIC 3, MMIC 4) of the two azimuth packages 1102*a*, 1102*b*. The elevation package 1106*a* may include MMIC 3, while the elevation package 1106*b* may include MMIC 4. One elevation package, i.e. package 1106*b*, of the two elevation packages may include the plurality of second receiver columns of the second antenna array, while another elevation package, i.e. package 1106*a*, of the two elevation packages may include the first receiver column, the first transmitter column, and the second transmitter column of the second antenna array. The first transmitter column and the second transmitter column of the second antenna array may serve as elevation short range transmitters.

The array arrangement may include a first electrical connection 1104 electrically connecting the monolithic microwave integrated circuit (MMIC) dies (MMIC 1, MMIC 2) of the two azimuth packages 1102*a-b* and the monolithic microwave integrated circuit (MMIC) dies (MMIC 3, MMIC 4) of the two elevation packages 1106*a-b*. The first electrical connection 1104 may be an electrical wire connecting dies MMIC1, MMIC2, MMIC3, MMIC4 for synchronization.

The array arrangement may also include a further azimuth package 1102*c* including a first long range transmitter arrangement and a second long range transmitter arrangement interdigitated with the first long range transmitter arrangement, the first long range transmitter arrangement and the second long range transmitter arrangement electrically connected to the monolithic microwave integrated circuit (MMIC) die (MMIC 4) of the elevation package 1106*b*. The first long range transmitter arrangement and the second long range transmitter arrangement of the further azimuth package 1102*c* may be electrically connected to MMIC MMIC 2 included in the two azimuth packages 1102*a*, 1102*b* via MMIC 4 and the electrical connection 1104.

The array arrangement may include a second electrical connection 1108*a* electrically connecting the first long range transmitter arrangement of the further azimuth package 1102*c* to MMIC 4. The array arrangement may also include a third electrical connection 1108*b* electrically connecting the second long range transmitter arrangement of the further azimuth package 1102*c* to MMIC 4. MMIC 4 may have two transmission (Tx) ports in electrical connection with the long range transmitter arrangements of the further azimuth package 1102*c* via electrical connections 1108*a*, 1108*b*. MMIC 4 may also have receive (Rx) ports (e.g. 4) in electrical connection with the plurality of second receiver columns (e.g. 4) of the second antenna array included in package 1106*b*.

The array arrangement may additionally include a further elevation package 1106*c* orthogonal to the further azimuth package 1102*c*, the further elevation package 1106*c* including a further first long range transmitter arrangement and a further second long range transmitter arrangement interdigitated with the further first long range transmitter arrangement, the further first long range transmitter arrangement and the further second long range transmitter arrangement electrically connected to the monolithic microwave integrated circuit (MMIC) die (MMIC) of the azimuth package 1102*a*. The first long range transmitter arrangement and the second long range transmitter arrangement of the further elevation package 1106*c* may be electrically connected to MMIC 3, MMIC 4 included in the two elevation packages 1106*a*, 1106*b* via MMIC 1 and the electrical connection 1104.

The array arrangement may include a fourth electrical connection 1110*a* electrically connecting the further first long range transmitter arrangement of the further elevation package 1106*c* to MMIC 1. The array arrangement may also include a fifth electrical connection 1110*b* electrically connecting the further second long range transmitter arrangement of the further elevation package 1106*c* to MMIC 1. MMIC 1 may have two transmission (Tx) ports in electrical connection with the long range transmitter arrangements of the further elevation package 1106*c* via electrical connections 1110*a*, 1110*b*. MIMIC 1 may also have receive (Rx) ports (e.g. 4) in electrical connection with the plurality of second receiver columns (e.g. 4) of the first antenna array included in package 1102*a*.

In addition, MMIC 2 may have two transmission (Tx) ports in electrical connection with the azimuth short range transmitters of the first antenna array included in package 1102*b*, and a plurality of receive (Rx) ports (e.g. 4). One of the plurality of receive ports may be in electrical connection with the first receiver column of the first antenna array included in package 1102*b*.

MMIC 3 may have two transmission (Tx) ports in electrical connection with the elevation short range transmitters of the second antenna array included in package 1106*a*, and a plurality of receive (Rx) ports (e.g. 4). One of the plurality of receive ports may be in electrical connection with the first receiver column of the second antenna array included in package 1106*a*.

The array arrangement may include a printed circuit board (PCB) 1112. The two azimuth packages 1102*a-b*, the further azimuth package 1102*c*, the two elevation packages 1106*a-b*, and the further elevation package 1106*c* may be arranged over the printed circuit board 1112.

All MMIC dies may be cascaded together and only 4 dies (MMIC 1-4) may be needed for DOA detection. Compared to the arrangement shown in FIG. 10, 2 MMIC dies may be saved. However, MMIC 1 and MMIC 4 may need to connect the structures in different packages 1102*c*, 1106*c*, using RF signals which are lossy. The electrical connections 1108*a-b* may be configured to carry the RF signals from the package 1102c to MMIC 4, while the electrical connections 1110a-b may be configured to carry RF signals from the package 1106c to MMIC 1.

Various embodiments may include horizontal and vertical scanning radars. Horizontal and vertical radars include LRR and SRR, respectively. Various embodiments may allow the different radars to work together. In principle, if the transmitted signals of the radars are orthogonal to one another, these radars may work together. A multiplexing method, i.e. time division multiplexing(TDM), may allow the different radars to work together. However, various embodiments may not be limited for TDM.

FIG. 12 is a schematic showing a time division multiplexing method according to various embodiments. As shown in FIG. 12, different transmitter columns/arrangements associated with different MMIC dies may be involved in transmission at different time intervals. For instance, from $T_0$ to $T_1$, Tx1 associated with MMIC2 may be transmitting; from $T_1$ to $T_2$, Tx2 associated with MMIC 2 may be transmitting; from $T_2$ to $T_3$, Tx1 associated with MMIC3 may be transmitting etc.

Various embodiments may advantageously offer compact size integrating horizontal and vertical, LRR, and SRR radars. Various embodiments may enable high resolution radar implementation in packages possible. The high DoF may further allow various embodiments to be able to achieve high resolution DoA estimation.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. An antenna array comprising:
    a first receiver column;
    a plurality of second receiver columns; and
    a first transmitter column and a second transmitter column arranged between the first receiver column and the plurality of second receiver columns;
    wherein a spacing between the first transmitter column and the second transmitter column is half a spacing between neighbouring second receiver columns of the plurality of second receiver columns; and
    wherein a distance between the first receiver column and a second receiver column of the plurality of second receiver columns nearest to the first receiver column is N times the spacing between the neighbouring second receiver columns of the plurality of second receiver columns, N being a timber of second receiver columns.

2. The antenna array according to claim 1, wherein a centre line between the first transmitter column and the second transmitter column is half the distance between the first receiver column and the second receiver column of the plurality of second receiver columns nearest to the first receiver column.

3. The antenna array according to claim 2, wherein a distance between the centre line and the first transmitter column is equal to a distance between the centre line and the second transmitter column.

4. The antenna array according to claim 1, further comprising:
    a first long range transmitter arrangement comprising a plurality of further transmitter columns; and
    a second long range transmitter arrangement comprising a plurality of additional transmitter columns, the second long range transmitter arrangement interdigitated with the first long range transmitter arrangement.

5. The antenna array according to claim 1,
    wherein the first receiver column comprises a first plurality of receiver antenna elements;
    wherein each of the plurality of second receiver columns comprises a second plurality of receiver antenna elements;
    wherein the first plurality of receiver antenna elements of the first receiver column are in electrical connection with one another; and
    wherein the second plurality of receiver antenna elements comprised in each of the plurality of second receiver column are in electrical connection with one another.

6. The antenna array according to claim 1,
    wherein the first transmitter column comprises a first plurality of transmitter antenna elements;
    wherein the second transmitter column comprises a second plurality of transmitter antenna elements;
    wherein the first plurality of transmitter antenna elements comprised in the first transmitter column are in electrical connection with one another; and
    wherein the second plurality of transmitter antenna elements comprised in the second transmitter column are in electrical connection with one another.

7. The antenna array according to claim 1, wherein the antenna array forms an equivalent virtual array of 8N−1 virtual channels.

8. An array arrangement comprising:
   two azimuth packages comprising a first antenna array according to claim 1, each of the two azimuth packages comprising a monolithic microwave integrated circuit (MMIC) die;
   a further azimuth package comprising a first long range transmitter arrangement and a second long range transmitter arrangement interdigitated with the first long range transmitter arrangement, the further azimuth package comprising a monolithic microwave integrated circuit (MMIC) die electrically connected to the monolithic microwave integrated circuit (MMIC) dies of the two azimuth packages;
   two elevation packages comprising a second antenna array according to claim 1 arranged orthogonal to the first antenna array, each of the two elevation packages comprising a monolithic microwave integrated circuit (MMIC) die; and
   a further elevation package orthogonal to the further azimuth package, the further elevation package comprising a further first long range transmitter arrangement and a further second long range transmitter arrangement interdigitated with the further first long range transmitter arrangement, the further elevation package comprising a monolithic microwave integrated circuit (MMIC) die electrically connected to the monolithic microwave integrated circuit (MMIC) dies of the two elevation packages.

9. The array arrangement according to claim 8, further comprising:
   a first electrical connection electrically connecting the monolithic microwave integrated circuit (MMIC) dies of the two azimuth packages;
   a second electrical connection electrically connecting the first electrical connection and the monolithic microwave integrated circuit (MMIC) die of the further azimuth package;
   a third electrical connection electrically connecting the monolithic microwave integrated circuit (MMIC) dies of the two elevation packages; and
   a fourth electrical connection electrically connecting the third electrical connection and the monolithic microwave integrated circuit (MMIC) die of the further elevation package.

10. The array arrangement according to claim 8, further comprising:
    a printed circuit board;
    wherein the two azimuth packages, the further azimuth package, the two elevation packages and the further elevation package are arranged over the printed circuit board.

11. The array arrangement according to claim 8, wherein one azimuth package of the two azimuth packages comprises the plurality of second receiver columns of the first antenna array; and
    wherein another azimuth package of the two azimuth packages comprises the first receiver column, the first transmitter column, and the second transmitter column of the first antenna array.

12. The array arrangement according to claim 8, wherein one elevation package of the two elevation packages comprises the plurality of second receiver columns of the second antenna array; and
    wherein another elevation package of the two elevation packages comprises the first receiver column, the first transmitter column, and the second transmitter column of the second antenna array.

13. An array arrangement comprising:
    two azimuth packages comprising a first antenna array according to claim 1, each of the two azimuth packages comprising a monolithic microwave integrated circuit (MMIC) die;
    a further azimuth package comprising a first long range transmitter arrangement and a second long range transmitter arrangement interdigitated with the first long range transmitter arrangement, the first long range transmitter arrangement and the second long range transmitter arrangement electrically connected to at least one monolithic microwave integrated circuit (MMIC) die of the monolithic microwave integrated circuit (MMIC) dies comprised in the two azimuth packages;
    two elevation packages comprising a second antenna array according to claim 1 arranged orthogonal to the first antenna array, each of the two elevation packages comprising a monolithic microwave integrated circuit (MMIC) die electrically connected to the monolithic microwave integrated circuit (MMIC) dies of the two azimuth packages; and
    a further elevation package orthogonal to the further azimuth package, the further elevation package comprising a further first long range transmitter arrangement and a further second long range transmitter arrangement interdigitated with the further first long range transmitter arrangement, the further first long range transmitter arrangement and the further second long range transmitter arrangement electrically connected to at least one monolithic microwave integrated circuit (MMIC) die of the monolithic microwave integrated circuit (MMIC) dies comprised in the two elevation packages.

14. The array arrangement according to claim 13, further comprising:
    a first electrical connection electrically connecting the monolithic microwave integrated circuit (MMIC) dies of the two azimuth packages and the monolithic microwave integrated circuit (MMIC) dies of the two elevation packages;
    a second electrical connection electrically connecting the first long range transmitter arrangement of the further azimuth package to one of the monolithic microwave integrated circuit (MMIC) dies of the two elevation packages;
    a third electrical connection electrically connecting the second long range transmitter arrangement of the further azimuth package to one of the monolithic microwave integrated circuit (MMIC) dies of the two elevation packages;
    a fourth electrical connection electrically connecting the further first long range transmitter arrangement of the further elevation package to one of the monolithic microwave integrated circuit (MMIC) dies of the two azimuth packages; and
    a fifth electrical connection electrically connecting the further second long range transmitter arrangement of the further elevation package to one of the monolithic microwave integrated circuit (MMIC) dies of the two azimuth packages.

15. The array arrangement according to claim 13, further comprising:

a printed circuit board;
wherein the two azimuth packages, the further azimuth package, the two elevation packages and the further elevation package are arranged over the printed circuit board.

16. The array arrangement according to claim 13, wherein one azimuth package of the two azimuth packages comprises the plurality of second receiver columns of the first antenna array; and
wherein another azimuth package of the two azimuth packages comprises the first receiver column, the first transmitter column, and the second transmitter column of the first antenna array.

17. The array arrangement according to claim 13, wherein one elevation package of the two elevation packages comprises the plurality of second receiver columns of the second antenna array; and
wherein another elevation package of the two elevation packages comprises the first receiver column, the first transmitter column, and the second transmitter column of the second antenna array.

18. A method of forming an antenna array, the method comprising:
providing a first receiver column;
providing a plurality of second receiver columns; and
providing a first transmitter column and a second transmitter column arranged between the first receiver column and the plurality of second receiver columns;
wherein a spacing between the first transmitter column and the second transmitter column is half a spacing between neighbouring second receiver columns of the plurality of second receiver columns; and
wherein a distance between the first receiver column and a second receiver column of the plurality of second receiver columns nearest to the first receiver column is N times the spacing between the neighbouring second receiver columns of the plurality of second receiver columns, N being a number of second receiver columns.

19. The method according to claim 18, further comprising:
providing a first long range transmitter arrangement comprising a plurality of further transmitter columns; and
providing a second long range transmitter arrangement comprising a plurality of additional transmitter columns, the second long range transmitter arrangement interdigitated with the first long range transmitter arrangement.

20. The method according to claim 18, wherein the antenna array forms an equivalent virtual array of 8N−1 virtual channels.

* * * * *